United States Patent
Maricevic et al.

(10) Patent No.: US 9,847,836 B2
(45) Date of Patent: Dec. 19, 2017

(54) AGRREGATOR-BASED COST-OPTIMIZED COMMUNICATIONS TOPOLOGY FOR A POINT-TO-MULTIPOINT NETWORK

(71) Applicant: ARRIS Enterprises LLC, Suwanee, GA (US)

(72) Inventors: Zoran Maricevic, West Hartford, CT (US); Marcel F. Schemmann, Maria Hoop (NL); Venkatesh G. Mutalik, Middletown, CT (US); Zhijian Sun, Avon, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 79 days.

(21) Appl. No.: 15/057,292

(22) Filed: Mar. 1, 2016

(65) Prior Publication Data

US 2017/0257166 A1    Sep. 7, 2017

(51) Int. Cl.
*H04B 10/27*      (2013.01)
*H04B 10/2575*    (2013.01)
*H04J 14/02*      (2006.01)

(52) U.S. Cl.
CPC ....... *H04B 10/25751* (2013.01); *H04B 10/27* (2013.01); *H04J 14/0242* (2013.01)

(58) Field of Classification Search
CPC ............... H04B 10/25751; H04B 10/27; H04J 14/0242; H04J 14/0282; H04J 14/0226; H04J 14/0227; H04Q 11/0067; H04N 7/22
See application file for complete search history.

(56) References Cited

U.S. PATENT DOCUMENTS

| | | |
|---|---|---|
| 5,262,883 A | 11/1993 | Pidgeon |
| 5,331,449 A | 7/1994 | Huber et al. |
| 5,914,799 A | 6/1999 | Tan |
| 6,041,056 A | 3/2000 | Bigham et al. |
| 6,194,964 B1 | 2/2001 | Jun |
| 7,941,022 B1 | 5/2011 | Schaffner et al. |
| 8,837,953 B2 | 9/2014 | Mutalik et al. |
| 2002/0061163 A1 | 5/2002 | Bartur |

(Continued)

FOREIGN PATENT DOCUMENTS

| | | |
|---|---|---|
| CN | 202841136 | 3/2013 |
| EP | 1235434 A2 | 8/2002 |

(Continued)

OTHER PUBLICATIONS

"OBI free", retrieved from the Internet at <http://www.emc-web.com/J_emc/index.php? option=com_content&view=article&id=65:obi-free&catid=47:paper&Itemid=182\> on Mar. 24, 2015.

(Continued)

*Primary Examiner* — Ted Wang
(74) *Attorney, Agent, or Firm* — Lori Anne D. Swanson

(57) ABSTRACT

An optical combiner for a communications network transmitting both upstream signals and a downstream optical signal. The communications network includes an array of amplifiers, each receiving a respective instance of the downstream optical signal. The output of each amplifier is split among a plurality of ports in a first splitter/combiner unit. The first splitter/combiner unit transmits the amplified downstream optical signal to respective second splitter/combiner units.

19 Claims, 7 Drawing Sheets

(56) References Cited

U.S. PATENT DOCUMENTS

| | | |
|---|---|---|
| 2002/0154371 A1 | 10/2002 | West |
| 2003/0113059 A1* | 6/2003 | BuAbbud .......... H04N 7/17309 385/24 |
| 2009/0067845 A1* | 3/2009 | Zhong ................. H04J 14/0204 398/83 |
| 2010/0303471 A1 | 12/2010 | Khalouf |
| 2011/0069956 A1 | 3/2011 | Biegert |
| 2011/0078755 A1 | 3/2011 | Dai |
| 2012/0043584 A1 | 2/2012 | Joshi |
| 2014/0010555 A1 | 1/2014 | Lentz |
| 2014/0369689 A1 | 12/2014 | Gadkari |
| 2015/0304052 A1 | 10/2015 | Schemmann et al. |

FOREIGN PATENT DOCUMENTS

| | | |
|---|---|---|
| EP | 1235434 B1 | 10/2005 |
| EP | 2530861 A2 | 12/2012 |
| JP | 2007 005968 | 1/2007 |
| WO | 2013/016450 A1 | 1/2013 |
| WO | 2015/164055 A1 | 10/2015 |

OTHER PUBLICATIONS

A. Tan, "Super Pon-A Fiber to the Home Cable Network for CATV and POTS/ISDN/VOD as Economical as a Coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical Beat Interference in RFoG Systems", ARRIS White Paper, ARRIS Enterprises, Inc., 2014, 31 pgs.

V. Mutalik, et al., "Partnership for Extended Capacity: DOCSIS 3.1 with RFoG", ARRIS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

Official Action, Re: Taiwan Application No. 104112768, dated Apr. 18, 2016.

PCT Search Report & Written Opinion, Re: Application No. PCT/US2015/024110, dated Jun. 30, 2015.

PCT Search Report & Written Opinion, RE: Application No. PCT/US2017/019196, dated May 10, 2017.

* cited by examiner

US 9,847,836 B2

AGRREGATOR-BASED COST-OPTIMIZED COMMUNICATIONS TOPOLOGY FOR A POINT-TO-MULTIPOINT NETWORK

CROSS-REFERENCE TO RELATED APPLICATIONS

None.

BACKGROUND

The present disclosure relates to systems and methods that process signals over a cable transmission network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider either through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path" "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial twisted pair conductor can carry six simultaneous phone calls, while a single fiber pair can carry more than 2.5 million phone calls simultaneously. Furthermore, coaxial cable, depending on the type/size/conductor) may have tens of dBs of losses per hundreds of feet (and the higher the RF frequency desired, the higher the coaxial cable losses). In HFC networks these losses require placement of in-line RF amplifiers. Conversely, optical FTTP has fewer losses and no need for in-line amplifiers. FTTP also allows consumers to bundle their communications services to receive telephone, video, audio, television, any other digital data products or services simultaneously.

One existing impairment of RFoG communication channels is Optical Beat Interference (OBI), which afflicts traditional RFoG networks. OBI occurs when two or more reverse path transmitters are powered on, and are very close in wavelength to each other. OBI limits upstream traffic, but also can limit downstream traffic. Existing efforts at mitigating OBI have focused on Optical Network Units (ONUs) at the customer premises, or on the CMTS at the head end. For example, some attempts to mitigate OBI make the ONUs wavelength specific while other attempts create an RFoG-aware scheduler in the CMTS. Still others attempts have included changing ONU wavelengths on the fly. Due to the fundamental nature of lasers and DOCSIS traffic, none of the above techniques yield satisfactory results as wavelength collisions still occur or cost is high. Thus, it may be desirable in RFoG deployments to further reduce or eliminate OBI.

DETAILED DESCRIPTION

Figure 1:
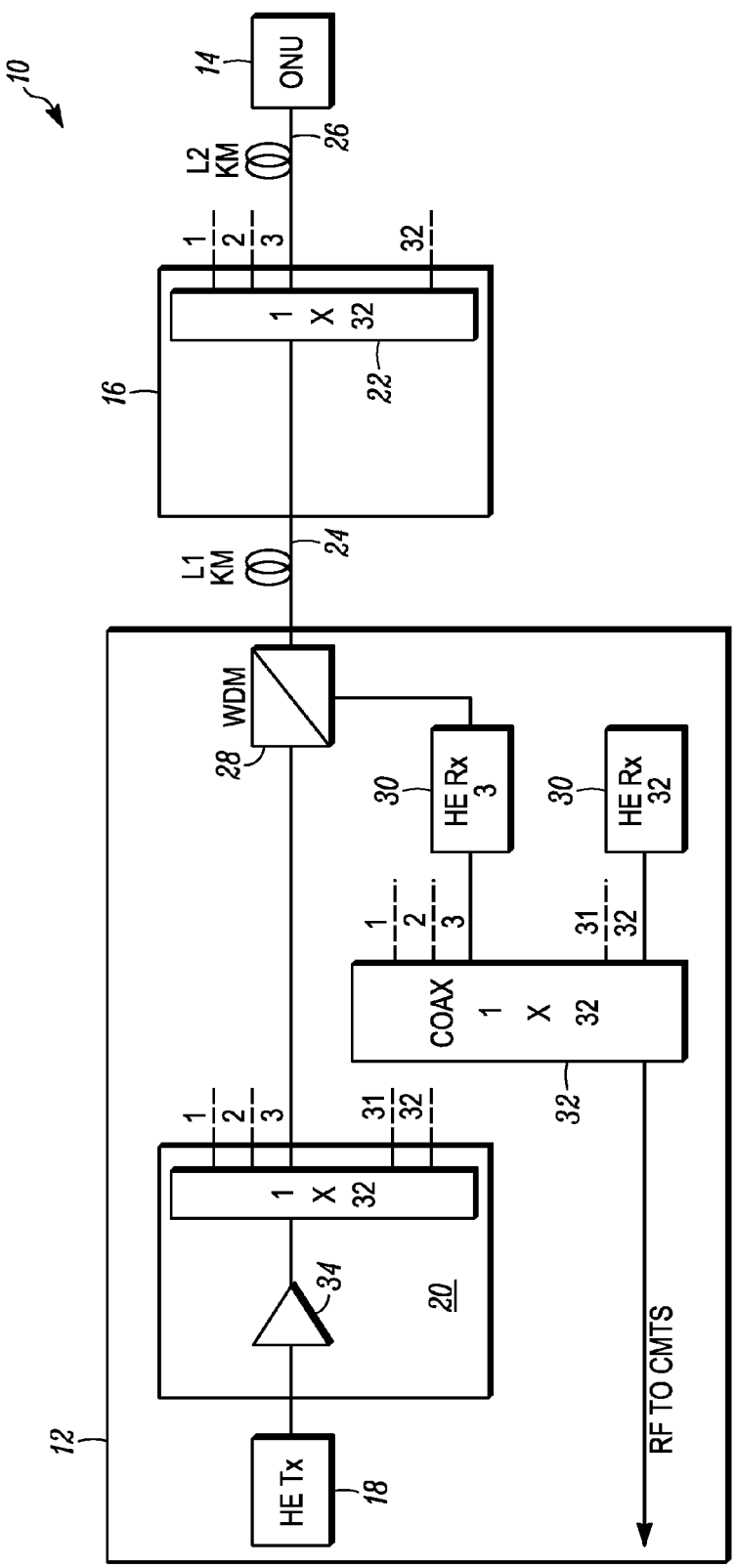
FIG. 1 shows an existing RFoG architecture.

FIG. 1 shows an exemplary existing RFoG system 10, where a head end 12 delivers content to an ONU 14 at a customer's premises through a node 16. An RFoG topology includes an all-fiber service from the head end 12 to a field node or optical network unit (ONU), which is typically located at or near the user's premises. In the head end 12, a downstream laser sends a broadcast signal that is optically split multiple times. The optical network unit, or ONU, recovers the RF broadcast signal and passes it into the subscriber's coax network.

The head end 12 typically includes a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16, which in turn includes another 1×32 splitter 22, where each output port of the splitter 22 is connected via another fiber segment 26 to a particular ONU 14 at a subscriber's premises.

Optical networking units (ONUs) in an RFoG environment terminate the fiber connection at a subscriber-side interface and convert traffic for delivery over the in-home network at the customer premises. Coaxial cable can be used to connect the ONUs of an RFoG network to one or more user devices, where the RFoG user devices can include cable modems, EMTAs, or set-top boxes, as with the user devices of an HFC network. For example, the ONU 14 may connect to set-top boxes, cable modems, or similar network elements via coaxial cable, and one or more of the cable modems may connect to the subscriber's internal telephone wiring and/or to personal computers or similar devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end 12, the splitter 22 operates as a combiner, i.e. up to 32 ONUs may deliver return path signals to the node 16, which combines them for upstream transmission along fiber length 24. Each of the signals from the respective ONU's 14 is then separated from other signals by the WDM 28 to be received by a receiver 30 in the head end 12. The signals from the respective receivers are then combined by a combiner 32 for transmission to a Cable Modem Termination Service (CMTS) in the head end 12. The signals are combined in the RF domain in the head end 12 by the combiner 32, before being connected to the CMTS upstream port.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 typically passes 1550 nm light from the EDFA 34 in forward direction and directs reverse light, typically at 1610 nm or perhaps 1310 nm in the reverse direction to the receivers 30. The WDM 28 may be connected to a fiber of length L1 that feeds the splitter 22 in the node 16. The outputs of the splitter 22 are each provided to second fibers of length L2 that are respectively connected to ONUs 14 at the subscriber homes. Typically, L1+L2 may be up to 25 km. The ONUs 14 convert the forward transmitted light to RF signals for the in-home coaxial network. The ONUs 14 also receive RF signals from the in-home network and modulate these signals onto a laser, operating at 1610 nm for example, and the laser's output is sent upstream into the fiber L2. The upstream signal is combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the passive optical combiner 22 that combines multiple optical inputs to a single output by definition creates OBI between these inputs, as described earlier and will therefore create noise in the RF domain at the head end receivers 30. Furthermore, a loss of around 24 dB must also be assumed in the forward path; for an EDFA output power of 18 dBm per port, this provides −6 dBm power to the receivers. This is sufficient for acceptable performance at the ONU to 1 GHz, provided low noise, high gain receivers are used.

The disclosed techniques for eliminating OBI are desirable, and the disclosed manner for eliminating OBI may enable higher capacity in the upstream and downstream. Described in more detail herein are embodiments for an architecture that incorporates the disclosed optical combiner system.

Figure 2:
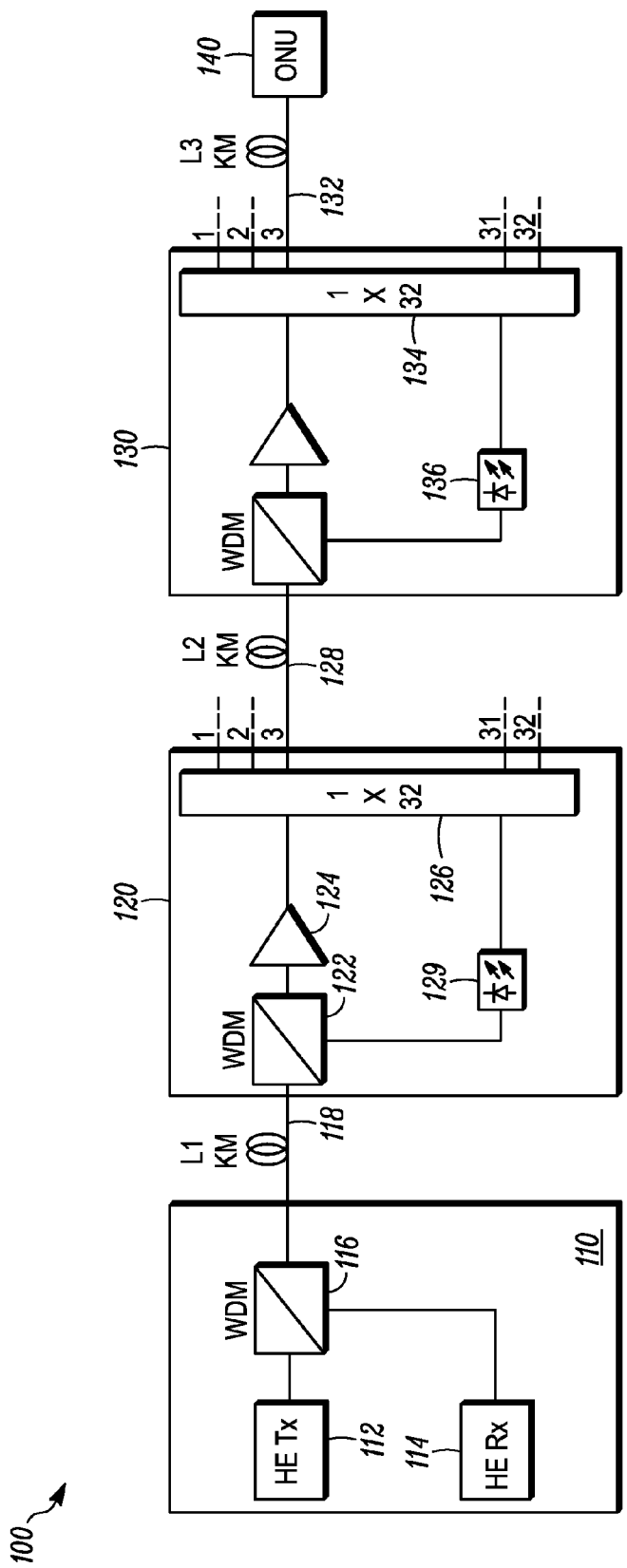
FIG. 2 shows an improved RFoG architecture.

FIG. 2 shows an improved system 100 for delivering CATV content to a plurality of subscribers over an RFoG network. The architecture shows a head end 110 having a transmitter 112 and receiver 114 each connected to a WDM splitter 116 that outputs a signal to, and receives a signal from, a fiber link 118 of L1 km. The fiber link 118 is connected to an active splitter/combiner unit 120. The splitter/combiner unit 120 may preferably include a WDM 122 that separates forward path signals from reverse path signals. The forward path signal from the WDM 122 is provided to an EDFA 124 that outputs an amplified optical signal to an active 1×32 splitter 126 that has 32 output ports, each to respective second fiber links 128. At each port, the power level can be modest (e.g. in the 0-10 dBm range) but can also be high (e.g. in the 18 dBm range).

In the reverse direction, the 1×32 port splitter 126 operates as an active combiner 126, and includes, at each port, a WDM that directs upstream light to a detector at the port, which converts received optical signals to electrical signals, amplifies them in the RF domain, and provides the electrical signals to a transmitter 129 that outputs light at, for example, 1610 nm, 1310 nm, or some other appropriate wavelength, provided to the WDM 122, which in turn directs the upstream light into fiber 118. At the head end 110, the fiber 118 is connected to WDM 116 that directs the upstream light to the receiver 114.

Each of the 32 ports of the splitter/combiner 126, through a respective fiber 128, output a respective signal to a second active splitter/combiner unit 130 of the same type and configuration as the splitter/combiner unit 120. The length(s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, will permit a higher total length of fiber between the head end 110 and the ONUs 140, such as 40 km, because the system 100 can tolerate a higher SNR loss, as further described below.

The upstream signals from the ONU 140 are individually terminated directly at the active splitter/combiner unit 130; even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical, and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110. Although the repeated re-transmission leads to some incremental reduction in SNR, improvements in SNR from the active architecture provides much greater overall performance relative to traditional RFoG systems. More importantly, because all reverse optical signals are individually terminated at separate detectors, there can be no optical beat interference (OBI) between different reverse signals. The reverse signals are not combined optically, hence OBI cannot occur.

In the forward direction there may be multiple EDFAs, such as EFDA 124 in the splitter/combiner unit 120; these EDFAs are cost effective single stage devices with low power dissipation—typically 2 Watts or less. Cascading the EDFAs results in an accumulation of noise due to the finite noise figures of the EDFAs. Whereas the active splitter architecture does not require the EDFAs, since an EFDA (not shown) in a high power head end 110 could still be used to provide power to the ONUs 140, the use of EDFAs, such as the EFDA 124, inside the active splitter units provides some advantages. For example, the complexity and power dissipation of equipment in the head end 110 is greatly reduced, as is the fiber count emanating from the head end 110. The amount of power delivered to the ONUs 140 is readily increased to approximately 0 dBm from −6 dBm in a traditional RFoG system. As a consequence, ONU receivers obtain 12 dB more RF level from their detectors and do not need as high a gain or a low a receiver noise contribution. Even with relaxed noise requirements at the ONU receivers, the SNR impact due to EDFA noise is easily overcome due to the higher received power. In addition, more spectrum can be supported in the forward direction with an acceptable SNR relative to current architectures, such as 4 GHz instead of 1 GHz in current RFoG, hence total data throughput rates can grow significantly without a change in operation to permit for example, services that provide 40 Gbps download speeds and 10 Gbps upload speeds.

Embodiments for an RFoG combiner include preventing or eliminating OBI at the combiner as opposed to managing it at the extremities of the network (such as using a CMTS scheduler at the head end side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

In some embodiments, the disclosed optical combiner (such as combiner 120 and/or 130 in FIG. 2) may be an active device that needs approximately 2 Watts of power. The optical combiner may be powered by power sources readily available in the RFoG system, or power can be provisioned into the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner. Also in case of power loss, ONU (Optical Networking Unit) at the homes would cease to function such that without any power backup such systems will cease to function, whether those are RFoG or PON systems, with or without the active combiner disclosed here. The head end optical receiver 114 may only need an input power range from 0-3 dBm, and require 15 dB less RF output power due to the absence of the RF combiner such that with such a high optical input power and low RF output power requirement the gain can be low.

The disclosed optical combiner may preferably eliminate OBI, making an OBI-free system. The optical combiner enables long reach and large splits, e.g. up to 40 km and 1024 splits, which will expand even further. The high upstream and downstream capacity enabled by the disclosed optical combiner includes up to 10G DS/1G US, and as high as 40G DS/10G US.

In embodiments, the disclosed optical combiner prevents interference in RFOG deployments in the combiner rather than preventing interference using measures taken in the ONU where previous attempts have failed or proven to be cost-prohibitive.

Figure 3:
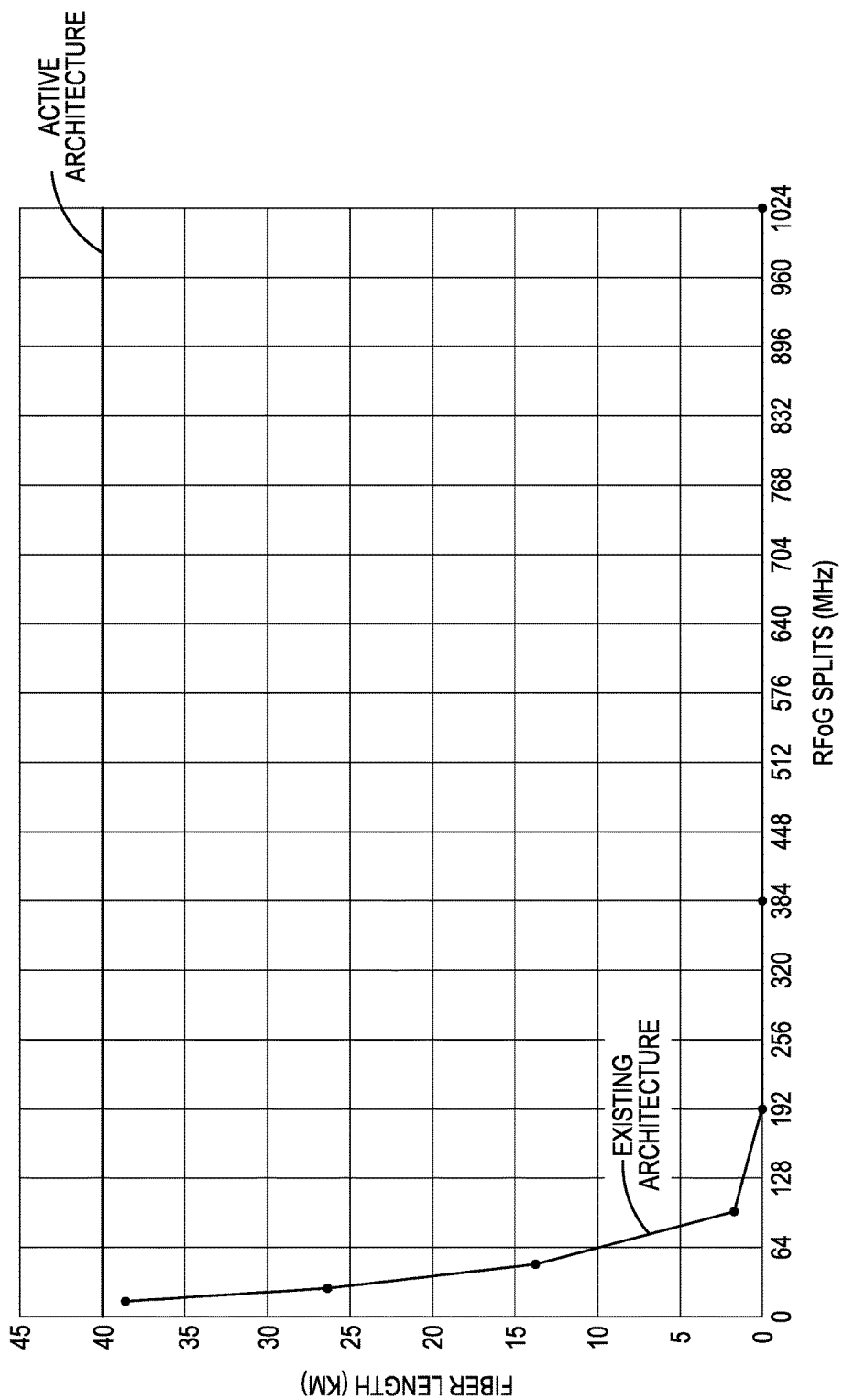
FIG. 3 compares capabilities of the architectures of FIGS. 1 and 2.

Traditional RFoG architectures have a fixed power budget. This means that as fiber length between the head end and the ONUs increases, a smaller number of splits may be used, as can be seen in FIG. 3 where the lower, curved line represents the existing architecture and the upper, curved line represents the active architecture disclosed herein. Conversely, the more splits that are desired, the less fiber length may be deployed. The disclosed active architecture, however, enables fiber length of up to approximately 40 km irrespective of the number of splits, meaning that the disclosed active architecture permits fiber lengths of 40 km or more along with a large number of splits, e.g. 1024, thereby advancing FTTP topology and deployment.

The overall cost of the active splitter architecture shown in FIG. 2 is similar to that of a traditional RFoG solution. The cost of active splitter EDFA gain blocks and WDM and detector components in the active architecture is offset by the elimination of head end gear such as receivers, high power EDFAs and combiners. A cost reduction of the ONUs that can operate with lower output power further supports the active splitter architecture. Further advantages of the active splitter architecture may include a reduction in outgoing fiber count from the head end, which can have a large impact on system cost, as well as an option to use 1310 nm reverse ONUs while staying within a typical SNR loss budget, which can further reduce costs. Also, the system shown in FIG. 2 exhibits increased bandwidth relative to what existing RFOG architectures are capable of providing, avoiding limits on service group sizes and concomitant requirements for more CMTS return ports. Finally, unlike OBI mitigation techniques in existing RFoG architectures, the system shown in FIG. 2 does not require cooled or temperature controlled optics and bi-directional communication links that necessitate additional ONU intelligence.

Each of these factors provides a further cost advantage of an active splitter solution over existing RFoG architectures. Required space and power in the head end is also reduced; the active splitter solution requires one transmit port, one receive port and one WDM component. Existing RFoG architectures, on the other hand, requires transmit ports, multi-port high power EDFAs, 32 WDM's, 32 receiver ports, and a 32-port RF combiner. Existing RFoG architectures require very low noise, high gain, and output power receivers with squelch methods implemented to overcome power loss and noise addition in the RF combiner. The system 100 shown in FIG. 2, conversely, works with input power normally in the 0-3 dBm range, little gain is required, and requires 15 dB less power output due to the absence of the RF combiner before the CMTS.

Preferably, the disclosed optical combiner unit implements a transmission line approach to combine multiple optical photodetectors in a single optical receiver. This may be accomplished in unidirectional or bidirectional configurations. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

Some active splitter/combiner systems may preferably include redundancy where active optical splitters switch their return laser power (the return laser that carries the combined information of the ONUs connected to it) between a high and a low power state or operates this laser in CW mode. In that case an upstream head end or active optical splitter can easily detect loss of power at an input port and enable a second input port connected to another fiber route to receive the information; in the forward path, the other fiber route would also be activated in this case because generally the forward and reverse light share the same fiber. Also, some active splitter/combiner systems may include a reverse laser in the active optical splitter that adjusts its power output as a function of the number of ONUs transmitter to the active optical splitter and the photocurrent received from these ONUs. Still other active splitter/combiner systems may have a gain factor and reverse laser power of the active optical splitter set to a fixed value.

Preferably, the disclosed optical combiner unit is able to configure itself under changing circumstances. Instances occur in which cable modems in the ONU are required to communicate with the CMTS even if there is no data to be transmitted. Usually, however, the ONU is turned off during periods when there is no data to be transmitted between the ONU and CMTS, and a cable modem could go hours before receiving or sending data. Thus, in some embodiments the disclosed combiner unit may be configured to stay in communication with the CMTS. Cable modems may be required to communicate back to the CMTS once every 30 seconds, or some other appropriate interval.

Passive Optical Network (PON) topologies typically comprise 32-port and 64-port splitting networks, mainly constrained by 17 dB/20 dB loss of these splitters, respectively. Since a typical PON link signal-to-noise (SNR) budget is on the order of 24 dB, the rest of the budget is then dedicated to allowing for link fiber loss, typically pairing up to 20 km fiber links with 1 by 32 split ratios and up to 10 km fiber links with 1 by 64 split ratios. This limitation applies equally to EPON and GPON, as well as to Radio Frequency over Glass (RFoG) approaches to fiber-to-the-premise (FTTP) network architectures. As can be seen in FIGS. 1 and 2, the design of a PON topology given this loss budget will typically use large numbers of EDFAs to service even a small group of customers. For example, to serve 256 customers, the architecture shown in FIG. 2 would require nine +17 dBm EDFAs. Similarly, seventeen +17 dBm EDFAs would be required to serve 512 users and thirty three +17 dBm EDFAs would be required to serve 1024 users. EDFA's are costly, and thus it would be of great benefit to design an architecture that can minimize the number of EDFAs used to service a given number of customers while nonetheless staying within the loss budget previously described, i.e. without degrading signal quality.

Figure 4:
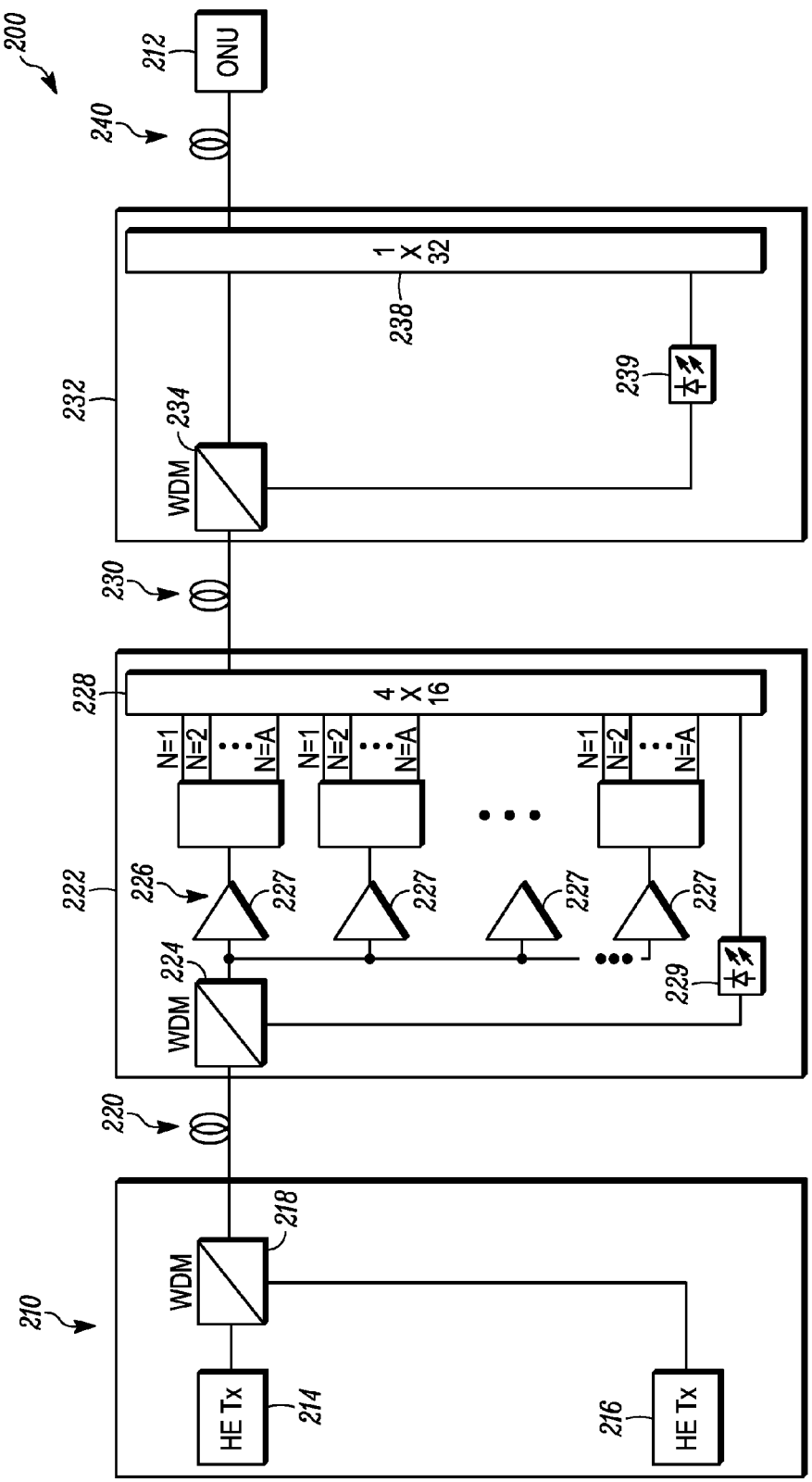
FIG. 4 shows an alternative architecture having an aggregator array of EDFAs that precede a splitter/combiner unit without any EDFAs.

Referring to FIG. 4, an alternative system 200 may comprise a head end 210 that delivers CATV content to one or more ONUs 212. The head end 210 may include a transmitter 214 that transmits downstream content to fiber link 220 connected to a combiner/splitter unit 222. The head end 210 may also include a receiver 216 that receives upstream signals from the fiber link 220 connected to the splitter/combiner unit 222, as well as a WDM 218 that separates the upstream and downstream signals.

The active combiner unit 222 may in turn be connected to one or more second splitter/combiner units 232 by respective second fiber links 230, that themselves deliver content to an ONU 212 through a third fiber link 240. Like the system shown in FIG. 2, the total distance provided by the fiber lengths 220, 230, and 240 may preferably be between approximately 0 km and 40 km. It should be understood that in the topology shown in FIG. 4, the splitter/combiner unit 222 is connected to multiple splitter combiner units 232 via the splitter/combiner network 228, and the splitter/combiner units exemplified by unit 232 are in turn connected to multiple ONUs via the splitter/combiner/network 238.

The splitter/combiner unit 222 preferably includes a WDM 224 that receives downstream path signals from the head end 210 and separates such signals from the upstream signals sent by respective ONUs 212. The splitter/combiner unit 222 also preferably includes at least one transmitter 229 to receive respective upstream signals from upstream ports of a splitter/combiner network 228 and direct the respective upstream signals to the WDM 224.

Figure 5:
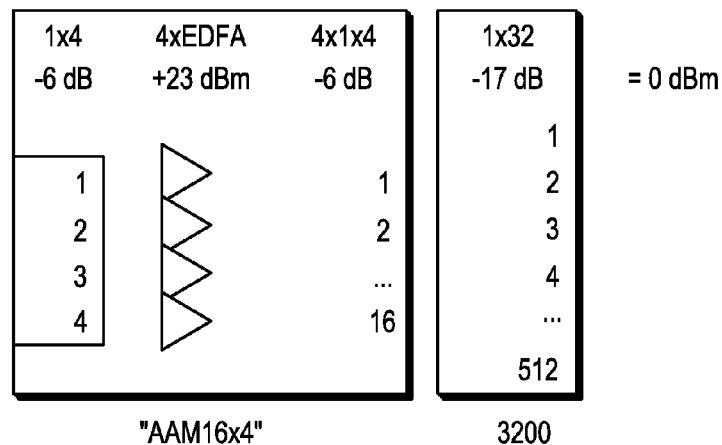
FIG. 5 shows power calculations for the architecture of FIG. 4.

Unlike the system shown in FIG. 2, however, the splitter/combiner network 222 includes an array 226 of EFDAs 227, where each EFDA 227 receives the downstream signal and provides it to each of a plurality of downstream ports of the splitter/combiner network 228. For example, in one preferred embodiment, each EFDA in the system of FIG. 2 provides the downstream signal to each of four ports of the splitter/combiner network 228. In some embodiments this may be accomplished using a splitter, but other embodiments may use any other device that delivers the downstream signal as an input to each of a group of ports of the splitter/combiner network 228. Preferably, each of the EFDAs 227 use as high of output power EDFA as possible, such as approximately +23 dBm for example. In this context, the term "approximately" means plus or minus 5%. This permits the downstream splitter/combiner units 232 to not have any EFDAs while still remaining within the loss budget previously mentioned. For example, referring to FIG. 5 and assuming that the splitter/combiner unit 222 utilizes four +23 dBm EFDAs where each EFDA is used to amplify a signal split among four outputs of the splitter/combiner unit 222 and thirty two outputs of a downstream splitter/combiner unit 232, 512 customers could be served with an approximate zero dbm forward optical level. In this context, the word approximate means plus or minus 1 dBm.

Stated differently, the splitter/combiner unit 222 has an EDFA array that aggregates the amplification along the entire path between it and the ONUs that it serves, thus eliminating the need for multiple EDFA's along the downstream direction. The system of FIG. 2, for example, would need seventeen +17 dBm EFDAs to serve 512 customers while the system of FIG. 4 only requires four +23 dBm EFDAs to serve the same amount of customers, thereby achieving substantial cost savings despite the use of higher power EFDAs.

Referring again to FIG. 5, the present inventors realized that the loss after the EDFA needs to be held within the total EDFA output in order to attain an approximate zero dBm level into the downstream input/photo-detector of the ONU 212. The loss in front of the EDFA, however, while impacting the link feeding into the EDFA, does not affect the power level into the ONU. Thus those of ordinary skill in the art will appreciate that the system shown in FIG. 4 may (1) contain 1×4 splitter, followed with four +23 dBm EDFA blocks, each followed by 1×4 splitter, where the output of each is connected to a downstream 1×32 port splitter, in order to aggregate up to 512 users; (2) contain 1×2 splitter, followed with two +23 dBm EDFA blocks, each followed by 1×4 splitter, where the output of each is connected to a downstream 1×32 port splitter, in order to aggregate up to 256 users; (3) contain a "pass through" to just one +23 dBm EDFA, if only up to 128 users need to be aggregated within the same service group; and (4) contain a single fiber input and 4 ITU DWDM outputs, to de-multiplex signals from four downstream transmitters, each feeding into an up-to 128 users service group, one per each EDFA.

Moreover, those of ordinary skill in the art will appreciate that this approach is not limited to 32-port splitter/combiner downstream units. For example, a 16-port, 64-port, or even a 128-port downstream splitter/combiner may be used. Similarly, those of ordinary skill in the art will realize that the splitter/combiner unit 222 of FIG. 4 may utilize any desired number of EDFAs 227 in the array 226 depending on the number of customers to be served, and will also realize that higher powered EDFAs than +23 dBm may be used, as desired.

Figure 6:
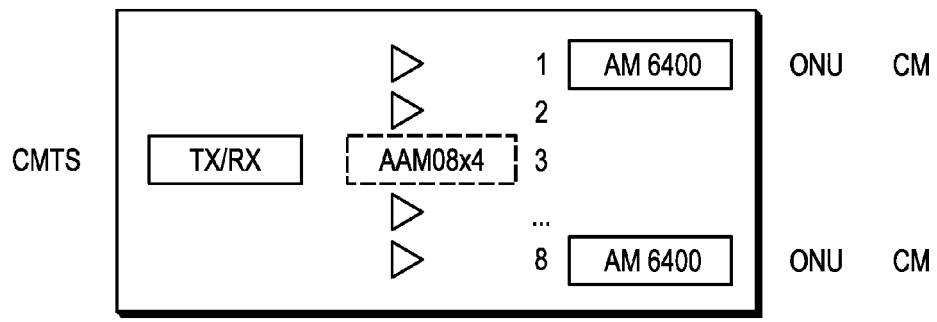
FIG. 6 shows an AAM topology based on the system of FIG. 4.
Figure 7:
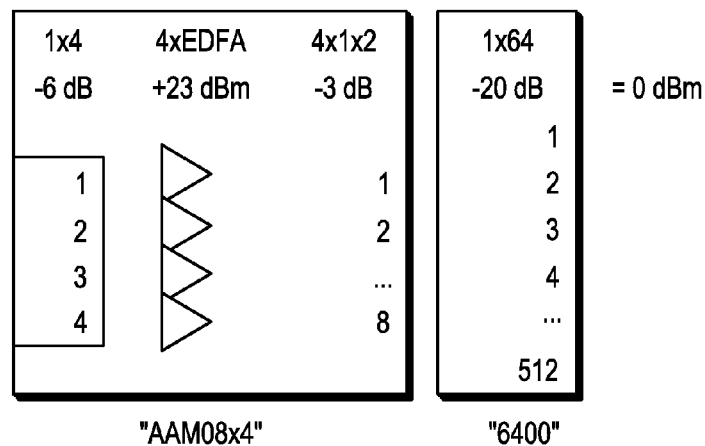
FIG. 7 shows power calculations for the topology of FIG. 6.

FIG. 6 shows an AAM-based topology, where an aggregator array of four +23 dBm EDFAs are each connected to two 64-port splitter/combiner units. FIG. 7 shows the power calculations for this configuration where the power loss at the ONU is 0 dBm.

Figure 8:
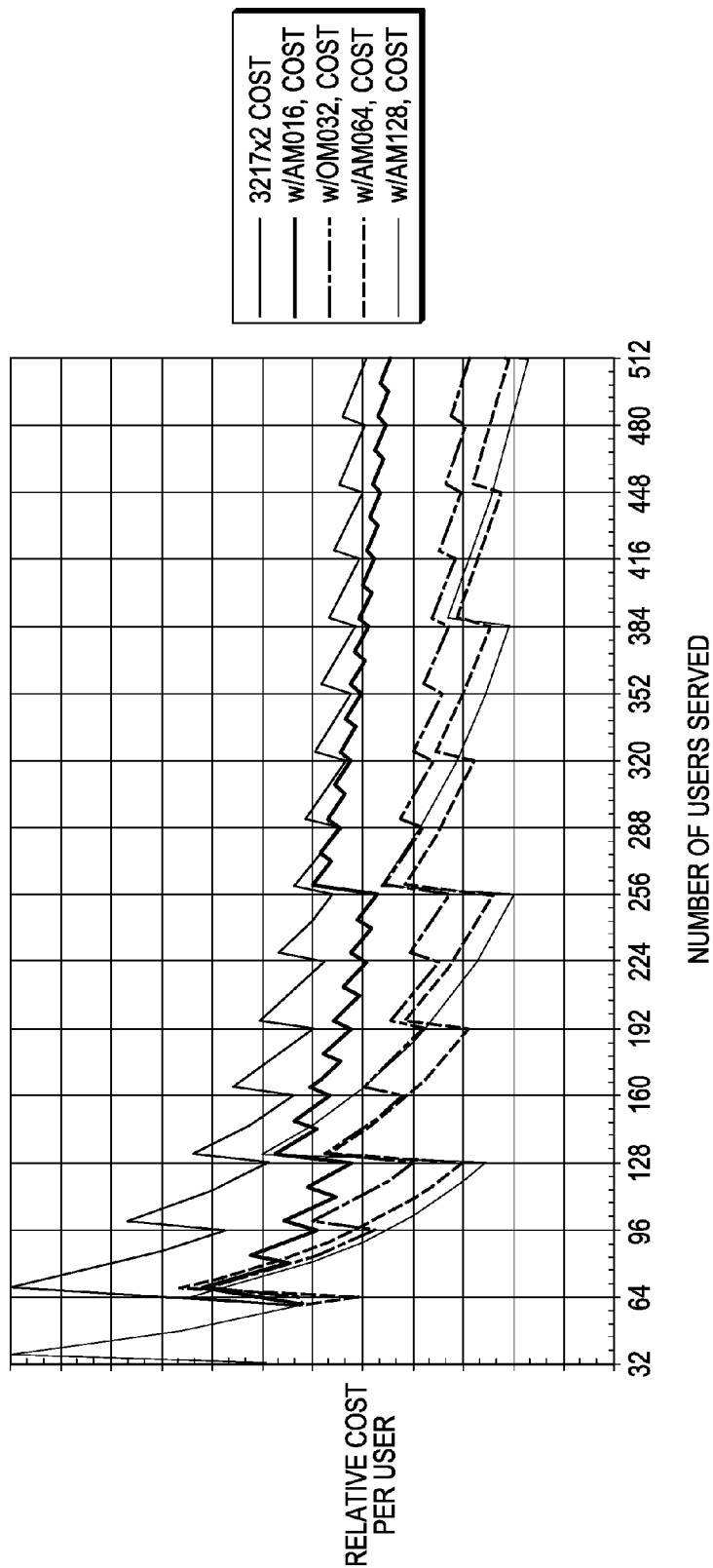
FIG. 8 shows the relative cost, per user, of the system of FIG. 4.

The cost of the architecture generally disclosed in FIG. 4 can be modeled by a $1^{st}$ order (liner) approximation:

$$Cost=BNB+C\_EDFA+N*PP$$

where BNB denotes "box and base" cost, C_EDFA denotes the cost of an EDFA, if present in the unit, N denotes the number of ports of either AAM or AM module, and PP denotes the "per port" cost. So, for example, $$AM3200\_Cost=BNB+32*PP$$

$$AM3217\_Cost=BNB+C\_EDFA+32*PP$$

$$AM6400\_Cost=BNB+64*PP$$

$$AAM08\times4\_Cost=BNB+4*C\_EDFA+8*PP$$

and so on. FIG. 8 generally illustrates these costs. As can be seen in this figure, while generally true that the larger the number of ports for the splitter/combiner 232 the lower the cost, this cost savings occurs only up to a point, and only for some optimally selected number of users (i.e. larger than 128, and typically powers of 2, such as 256 and 512). Overall, the most recommended configuration, for the lowest-cost per user, for most of the user per service group values, is utilization of AAM08×4 followed by AM6400—as depicted in FIG. 6.

Figure 9:
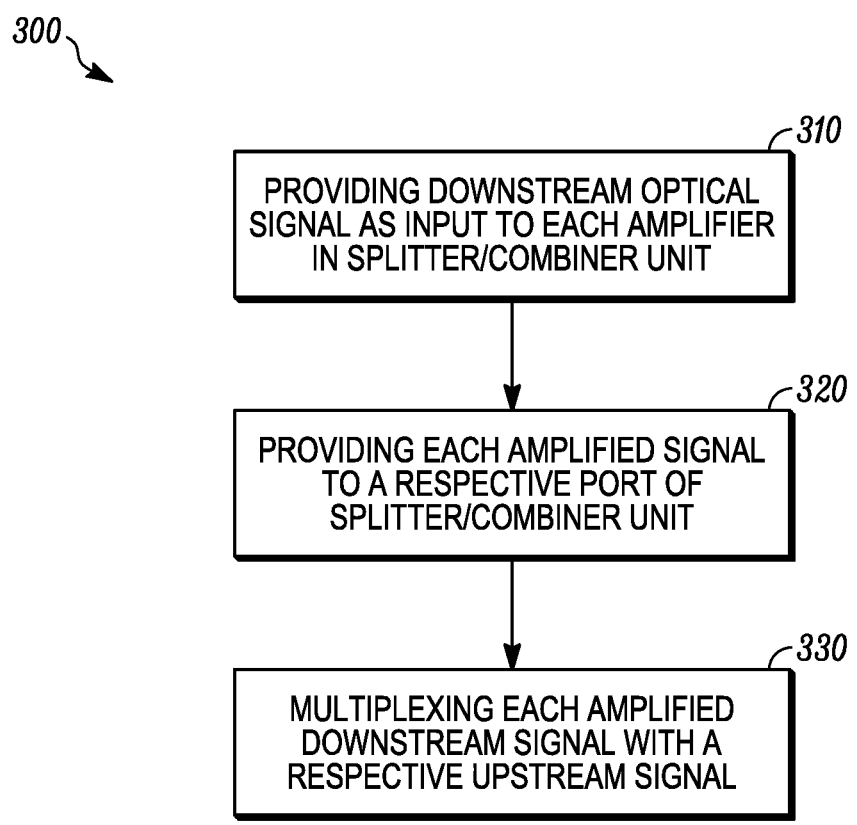
FIG. 9 shows a flowchart of an exemplary method in accordance with the present disclosure.

Referring to FIG. 9, a preferred method 300 is shown that is preferably implemented by a system comprising a head end, a plurality of splitter/combiner units, and an ONU. A first step 310 preferably comprises a head end providing a downstream optical signal as an input to each of a plurality of amplifiers in a splitter combiner unit. A second step 320 preferably comprises providing each amplified signal present at the respective outputs of the amplifiers to a respective downstream output port of the splitter combiner unit. A third step 330 preferably comprises multiplexing each amplified downstream signal with a respective upstream signal.

Preferably each amplifier is an EDFA, as disclosed previously, and the amplified downstream signal may in some embodiments be provided as an input to a second splitter/combiner unit that does not include any amplifiers, thus achieving greater cost efficiency while remaining within a desired loss budget, which may preferably be approximately 0 dBm. In some such embodiments, the downstream optical signal may be separately amplified by four +23 dBm EDFAs in a first splitter/combiner unit, where the amplified output from each EDFA is provided to two separate 64-port second splitter/combiner units.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A device for relaying content between a head end and a plurality of subscribers remote from the head end, the device receiving a downstream optical signal from a head end and delivering the signal to each of a plurality of groups of users, the device comprising:
   (a) a first unit that receives the downstream optical signal from a head end and provides the downstream optical signal as a plurality of first inputs;
   (b) an array of amplifiers, each amplifier receiving a respective one of said first inputs, and each amplifier connected to a respective plurality of ports in a splitter/combiner unit, where the splitter/combiner unit receives and combines respective upstream signals; and
   (c) a multiplexer that multiplexes the respective upstream signal with the downstream optical signal from the head end.

2. The device of claim 1 operatively connected to a second device, the second device having a splitter/combiner unit that splits downstream signals and combines upstream signals, where the second device is free from including amplifiers that amplify the downstream signal.

3. The device of claim 2 in an AAM-based topology, where the first unit includes an array of four amplifiers, each connected to two 64-port second devices.

4. The device of claim 1 where each amplifier in the array of amplifiers is an EDFA.

5. The device of claim 1 including a splitter that receives the optical signal from said head end and splits it among a plurality of said amplifiers.

6. The device of claim 1 where each amplifier amplifies the optical signal by at least approximately 23 dBm.

7. The device of claim 1 where each of the subscribers are provided the optical signal from the head end at a loss of approximately 0 dBm.

8. A method for relaying a downstream optical signal from a head end to each of a plurality of subscribers remote from the head end, the method comprising:
   (a) providing the downstream optical signal as an input to each of an array of amplifiers;
   (b) providing the amplified optical signal from the output of each of the amplifiers in the array to a respective subset of ports in a splitter/combiner unit, the splitter/combiner unit receiving and combining respective upstream signals; and
   (c) multiplexing the respective upstream signal with the downstream optical signal from the head end.

9. The method of claim 8 where the splitter/combiner unit provides respective amplified downstream optical signals to respective second splitter/combiner units that each split the received downstream optical signal and combines upstream signals, where the second splitter/combiner unit is free from including amplifiers that amplify the downstream optical signal.

10. The method of claim 9 where the downstream optical signal is provided to an array of four amplifiers, and each amplifier provides an amplified output signal to two 64-port second splitter/combiner units.

11. The method of claim 8 where each amplifier in the array of amplifiers is an EDFA.

12. The method of claim 8 where the downstream optical signal from said head end is provided to a splitter, which outputs the optical signal to the input of each amplifier in the array of amplifiers.

13. The method of claim 8 the downstream optical signal is amplified by at least approximately 23 dBm.

14. The method of claim 8 where each of the subscribers are provided the optical signal from the head end at a loss of approximately 0 dBm.

15. A fiber optic system comprising:
(a) a head end and a plurality of ONUs that each receive content from the head end and relay the content to one or more subscribers;
(b) a first unit having an optical input and a plurality of optical outputs, and an array of amplifiers, each amplifier receiving a respective one of a plurality of signals split from the optical input, and each amplifier outputting an amplified signal to a respective set of said plurality of optical outputs; and
(c) at least one second unit that receives an optical signal from a respective one of the plurality of optical outputs of the first unit and splits the received optical signal into a plurality of split signals, and sends each split signal to a respective ONU, where the at least one second unit is free from optically amplifying the optical signal received from the respective one of the plurality of optical outputs of the first unit.

16. The fiber optic system of claim 15 in an AAM-based topology, where the first unit includes an array of four amplifiers, each connected to two 64-port second units.

17. The fiber optic system of claim 15 where each amplifier in the array of amplifiers is an EDFA.

18. The fiber optic system of claim 15 where each amplifier amplifies the optical signal by at least approximately 23 dBm.

19. The fiber optic system of claim 15 where each of the subscribers are provided the optical signal from the head end at a loss of approximately 0 dBm.

* * * * *